Sept. 3, 1940.   L. K. MARSHALL   2,213,226
MULTIPHASE GASEOUS DISCHARGE CONTROL TUBE SYSTEM
Filed Dec. 12, 1938   6 Sheets-Sheet 1

PHASE SHIFTER

INVENTOR
LAURENCE K. MARSHALL.
BY Elmer J. Gorn
ATTY.

Sept. 3, 1940.   L. K. MARSHALL   2,213,226
MULTIPHASE GASEOUS DISCHARGE CONTROL TUBE SYSTEM
Filed Dec. 12, 1938   6 Sheets-Sheet 2

0°- Firing Delay

45°- Firing Delay

INVENTOR
LAURENCE K. MARSHALL
BY Elmer J. Gorn
ATTY.

Sept. 3, 1940.   L. K. MARSHALL   2,213,226
MULTIPHASE GASEOUS DISCHARGE CONTROL TUBE SYSTEM
Filed Dec. 12, 1938   6 Sheets-Sheet 3

INVENTOR
LAURENCE K. MARSHALL
BY Elmer J. Gorn
ATTY.

INVENTOR
LAURENCE K. MARSHALL
BY Elmer J. Gorn
ATTY.

Sept. 3, 1940.   L. K. MARSHALL   2,213,226
MULTIPHASE GASEOUS DISCHARGE CONTROL TUBE SYSTEM
Filed Dec. 12, 1938   6 Sheets-Sheet 6
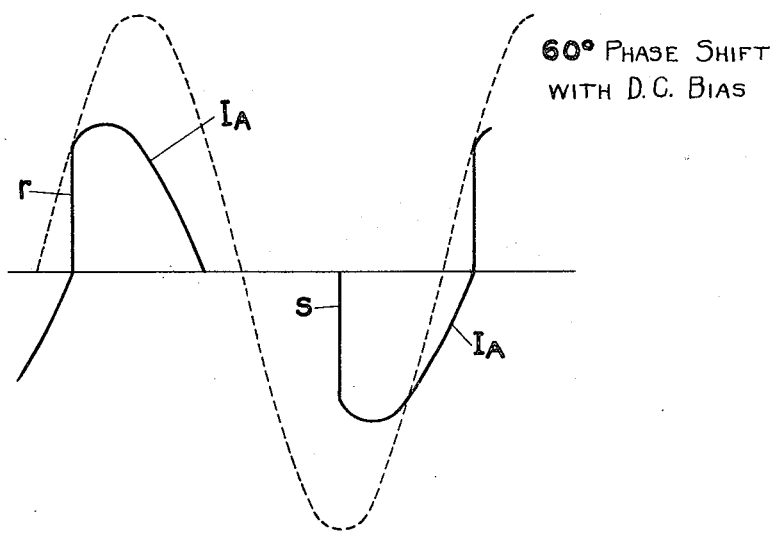
Fig. 11.   60° PHASE SHIFT WITH D.C. BIAS
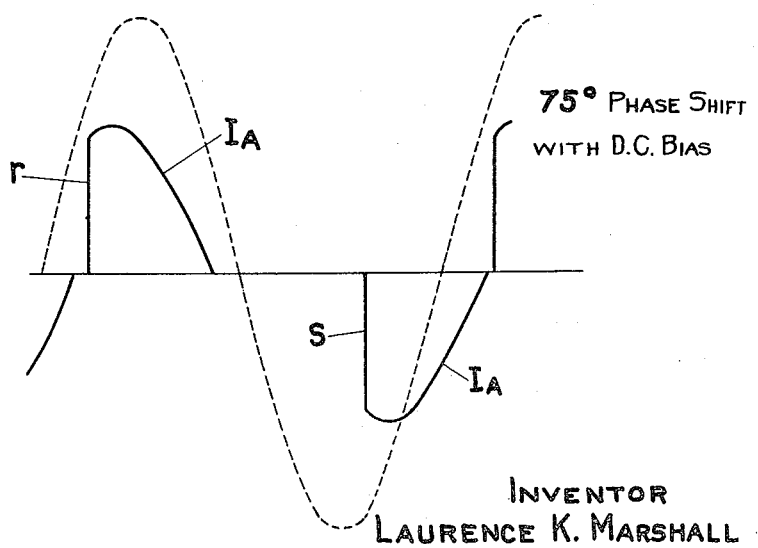
Fig. 12.   75° PHASE SHIFT WITH D.C. BIAS
INVENTOR
LAURENCE K. MARSHALL
BY Elmer J. Gorn
ATTY.

Patented Sept. 3, 1940

2,213,226

UNITED STATES PATENT OFFICE 2,213,226

MULTIPHASE GASEOUS DISCHARGE CONTROL TUBE SYSTEM

Laurence K. Marshall, Cambridge, Mass., assignor to Raytheon Manufacturing Company, Newton, Mass., a corporation of Delaware Application December 12, 1938, Serial No. 245,147

25 Claims. (Cl. 171—97)

This invention relates to multiphase gaseous discharge control tube and a system therefor.

An object of this invention is to produce an arrangement in which multiphase alternating current may be controlled by a single tube structure and a simple associated system.

Another object is to produce a tube in which a plurality of controlled discharge paths are provided, each for controlling a separate electrical phase.

A further object is to produce such a tube in which electrodes acting alternately as a cathode and anode are common to two of said phases.

A still further object is to utilize magnetic fields for controlling the starting of the discharge in each of the discharge paths of such tubes.

The foregoing and other objects of this invention will be best understood from the following description of an exemplification thereof, reference being had to the accompanying drawings, wherein:

Figs. 11 and 12 are curves representing the current flowing through one of the phases for two values of firing delay under the conditions of operation as represented in Fig. 10.

Figure 1:
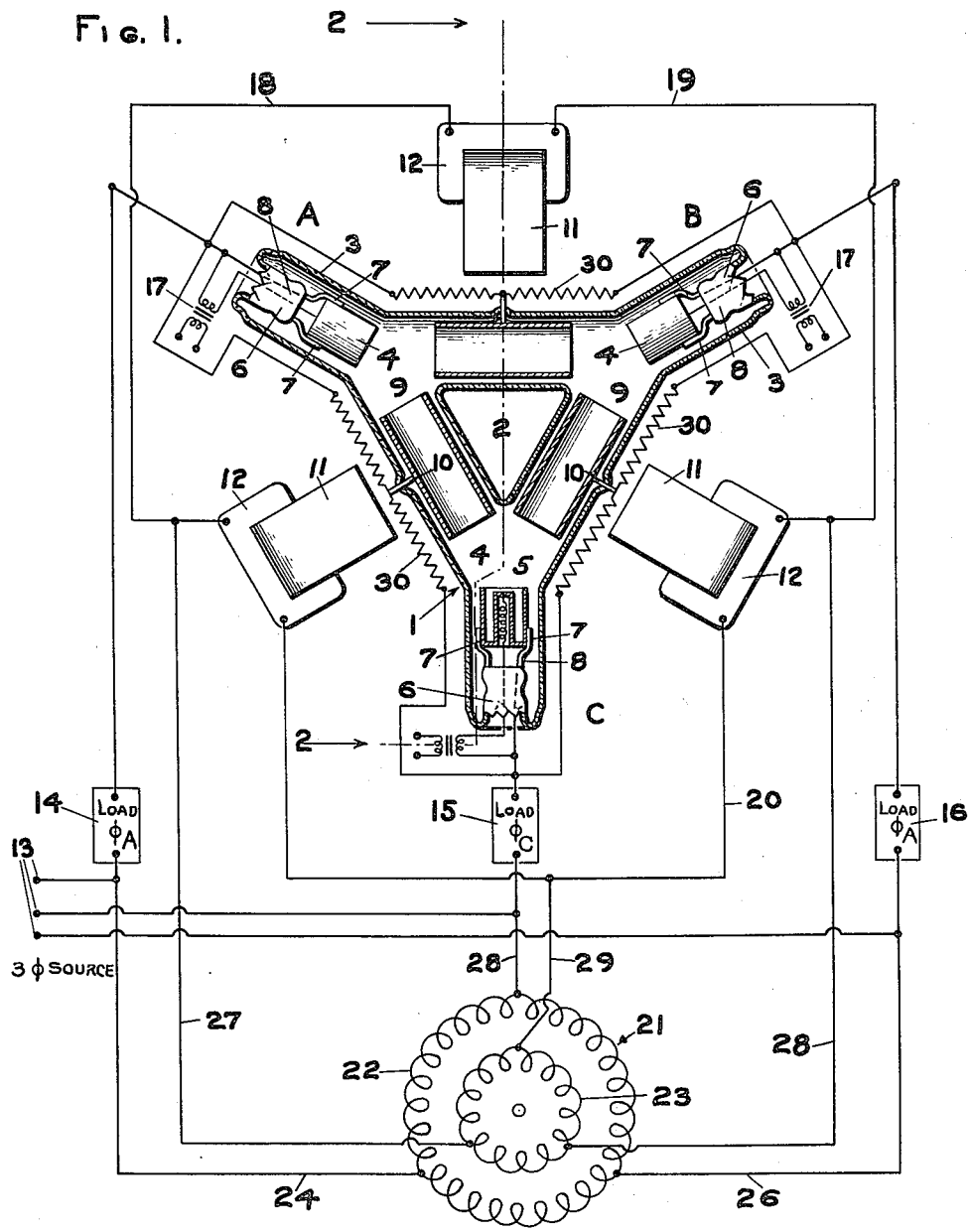
Fig. 1 is a cross-section of one embodiment of my novel tube, together with a diagrammatic representation of one embodiment of my novel system.

In the drawings, the tube illustrated consists of an envelope 1 having three tubular arms 2 connected in a triangular arrangement. At each apex of the triangle, the envelope is formed with a terminal arm 3. In each terminal arm is mounted a cathode 4. These cathodes are preferably of the type in which the active surface thereof is heated to temperature of thermionic emission. As illustrated in the lower terminal arm, the cathode may consist of a hollow box having a reentrant portion within which is located a heating filament 5. The internal surfaces of the cathode box are coated with emitting materials, preferably alkaline earth oxides. Each cathode 4 is supported upon a reentrant stem 6 formed in the outer end of the associated terminal arm 3. An external connection is afforded to the outer end of the heating filament 5 by means of a lead 8 sealed through the stem 6. The cathode is supported on the stem 6 by a pair of cathode standards 7, one of which extends through the stem 6 to afford an external electrical connection to the cathode. It will be noted that the other end of the heater 5 is electrically connected to the end of the reentrant portion of the cathode, and thus the external electrical connection to the cathode likewise forms the other connection to the heater 5.

Figure 2:
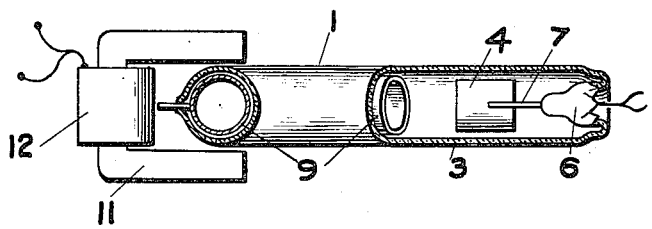
Fig. 2 is a cross-section of the tube taken along line 2—2 of Fig. 1.

The arrangement as described above affords three separate discharge paths between the three cathodes 4 extending through the three tubular arms 2. Within each tubular arm and surrounding the discharge path extending therethrough is located an intermediate electrode 9. These electrodes are of suitable non-magnetic conductive material, and may take a variety of forms. These electrodes may be perforate or imperforate, and in some instances may only partially surround the discharge path. Each intermediate electrode is provided with a lead 10 sealed through the wall of the associated tubular arm 3 and providing an external electrical connection to said intermediate electrode. The envelope 1 is filled with some suitable gaseous filling which may, for example, be a metallic vapor such as mercury vapor. Other ionizable gases, such as, for example, one of the noble gases, may be used as the filling within the envelope. The pressure of the gaseous filling is sufficient so that upon the passage of a discharge between two of the electrodes 4, intense ionization will occur and the discharge will pass at a relatively low voltage drop. In order to control the discharge, a magnetic field is set up transverse to the discharge path within each intermediate electrode 9. This magnetic field may be created by means of a magnetic core 11 having two arms disposed on opposite sides of the associated tubular arm 2. These magnetic cores in Fig. 1 are shown displaced from their true position in order to more clearly illustrate the tube structure. However, the position in which they are normally located is shown more clearly in Fig. 2. In order to magnetize the cores 11 so as to create the magnetic field, an energizing coil 12 is mounted upon each of said cores 11.

In a tube such as I have described above, when a voltage is impressed tbetween any two of the electrodes 4, an ionizing discharge tends to pass between said two electrodes. However, if the magnetic field created by the associated core 11 is greater than a predetermined minimum, said discharge will not start until the magnetic field falls below said predtermined minimum. The gas pressure is preferably so chosen that when the discharge does start, the magnetic field therefor may increase without stopping the flow of current through the discharge path between said two electrodes 4. This general type of control is more fully described and claimed in the patent to Percy L. Spencer, No. 2,124,682.

In order to utilize the tube structure described above to control three-phase alternating current, it may be connected in a circuit such as represented in Fig. 1. A source of three-phase current may be connected to three input terminals 13. These three terminals are connected respectively through three phases 14, 15 and 16 of a three-phase load to the three electrodes 4. For example, the three phases 14, 15 and 16 might represent three primary windings of a three-phase transformer whose secondary may be connected to any suitable type of three-phase consumption device. The three-phase load likewise may take any other suitable form. In order to heat the cathodes 4 to temperature of thermionic emission, a heating transformer 17 is connected to each of the two leads 7 and 8 extending from each cathode 4. The transformers 17 are energized and the three-phase source is connected to the terminals 13, as described above. In absence of the magnetic fields, due to the core 11, a discharge will pass between each pair of electrodes 4 whenever any appreciable voltage exists between them, and thus in effect these three electrodes under these conditions might be considered as being directly electrically connected to each other. The effect of such a connection therefore is to permit unimpeded current to flow through the three phases 14, 15 and 16 of the load.

In order to control the current through the three-phase load, the magnetizing coils 12 are supplied with current of suitable magnitude and of controllable phase with respect to the voltages impressed upon the electrodes 4 by means of a phase-shifting device 21. Although this device may take any suitable form, it is illustrated as comprising a continuous primary winding 22 connected at three points, spaced 120 degrees apart thereon, to the three terminals 13 by means of the conductors 24, 25 and 26. The primary winding 22 connected in this way will create a rotating magnetic field within it due to the three-phase excitation thereof. Within this rotating field is located a continuous secondary winding 23 which has connected thereto at three points, spaced 120 degrees apart thereon, the three conductors 27, 28 and 29. The conductors 27, 28 and 29 are connected respectively to the conductors 18, 19 and 20. The rotating magnetic field produced by the primary winding 22 generates a three-phase voltage in the secondary winding 23, which three-phase voltage is supplied to the three coils 12. The secondary winding 23 is arranged so as to be rotatable with respect to the primary winding 22. Such a rotation will shift the phase of the voltages generated in the secondary winding 23 with respect to the voltages supplied to the primary winding 22 in accordance with the angular orientation between said primary and secondary windings. Since the primary winding is supplied with the voltages of the three-phase source, it will be seen that the voltages supplied to the energizing coils 12 will be shifted in phase with respect to the voltages appearing between each pair of electrodes 4 in accordance with said angular orientation between the primary and secondary windings of the phase-shifting device 21. Of course it is to be understood that the phase-shifting device 21 is provided with suitable magnetic core members upon which the primary and secondary windings are wound respectively, so as to accomplish the operation as described above.

The intermediate electrodes 9 may be biased to any suitable voltage, but are preferably maintained at a voltage intermediate the two electrodes 4 between which it is located. For this purpose a potentiometer 30 is connected between each pair of electrodes 4, and the lead 10 of each intermediate electrode 9 is connected to substantially the midpoint of its associated potentiometer.

Figure 3:
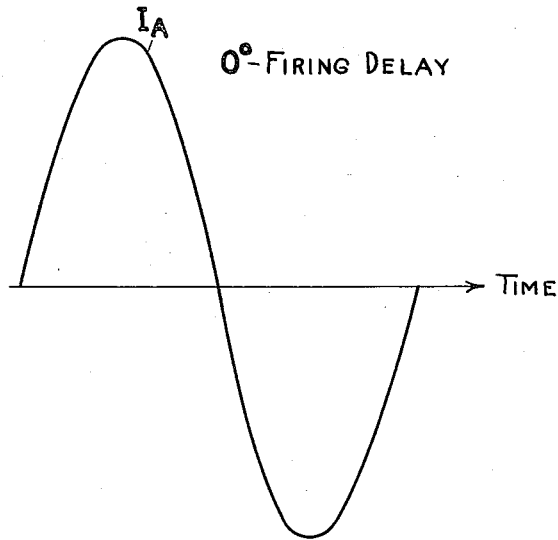
Figs. 3 to 6 are curves representing the current flowing through one electrical phase for various values of firing delay in the various discharge paths of the tube.

In analyzing the operation of the above system, the three corners of the control tube may be represented by A, B and C. Since the electrode 4 at each of said corners is connected directly in series with the respective load phases 14, 15 and 16, the current flowing to each electrode is likewise the current flowing through its associated phase. Therefore, the phases 14, 15 and 16 can be termed respectively phases A, B and C. In Figs. 3, 4, 5 and 6, the current $I_A$ flowing through one of the phases, for example phase A, is represented by the solid line, while the dotted line represents the current which would normally flow through the load without any control on the tube. If we consider, for example, the two upper electrodes 4 associated with the phases A and B, we see that the system tends to create an alternating voltage between said electrodes. When the left-hand electrode becomes positive with respect to the right-hand electrode, a discharge tends to occur between said two electrodes with the right-hand electrode acting as a cathode and the left-hand electrode acting as an anode. If the phase of the magnetic field created by the associated coil 12 passes through zero at substantially the beginning of the voltage wave impressed between said two electrodes 4, the discharge will start at substantially the instant when the left-hand electrode becomes positive with respect to the right-hand electrode, and such a discharge will cause a pulse of current to flow through the two phases 14 and 16. It will be understood that when the voltage falls to zero, this pulse of current ceases. However, as the voltage upon the two electrodes 4 tends to reverse, the magnetic field, due to the coil 12, likewise reverses at about the same time, and thus can pass through zero at the instant when the right-hand electrode 4 tends to become positive with respect to the left-hand electrode. This relationship of flux to voltage permits the discharge to start immediately, whereupon the left-hand electrode acts as a cathode and the right-hand electrode acts as an anode, thus passing another pulse of current through the two phases 14 and 16 in the opposite direction to the previous pulse. The same action occurs through each of the discharge paths, except that said action is displaced substantially 120 degrees with respect to the other. The resultant of such an operation, therefore, is to produce a substantially sine wave flow of current through each of the three phases of the load 14, 15 and 16, as illustrated in Fig. 3.

Figure 4:
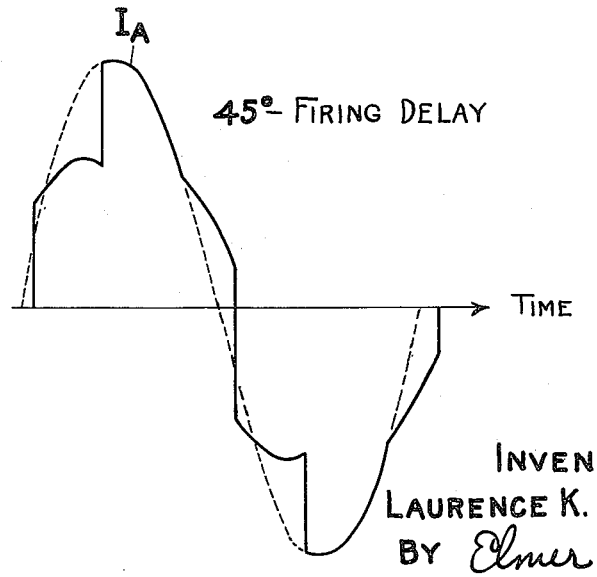
Figure 5:
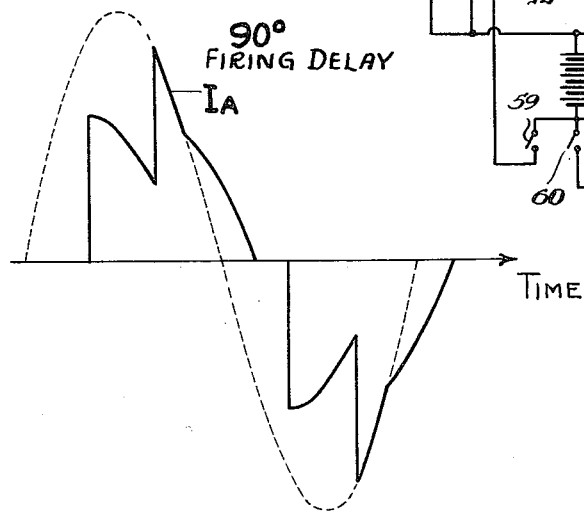
Figure 6:
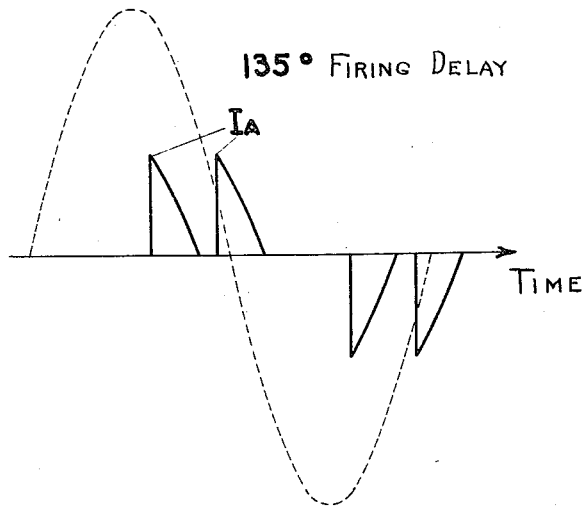

If instead of permitting the discharge to start at the beginning of each voltage wave impressed between each pair of electrodes 4, the phase-shifting device 21 is so adjusted that the flux created by each coil 12 does not pass through zero until 45 degrees after the voltage appears between the associated pair of eletrodes, a modified current will flow through each phase of the load. This is due to the fact that the starting of the discharge between each pair of electrodes 4 is delayed until said flux passes through said zero value. The result of this delay is to cause the current flowing in each phase of the load to be modified substantially as illustrated in Fig. 4. It will be noted that this wave has a substantially lower effective value than the wave shown in Fig. 3, and thus the delay in firing reduces the current flowing in the load. If the time of starting of the discharge is further delayed by phase shift of the current supplied to the energizing coils 12, the current through each phase is further modified as shown in Figs. 5 and 6, respectively. Fig. 5 represents a condition with a 90 degree delay, while Fig. 6 represents a condition with a 135 degree delay. It will be noted that the effective value of the current decreases with the increase in firing delay. Thus if it is desired to control the current through the three-phase load, it is merely necessary to adjust the phase-shifting device 21 so as to secure a greater or lesser degree of delay in the initiation of the discharge between each pair of electrodes 4 in accordance with whether a smaller or larger value of effective current is desired in each phase of the three-phase load.

Figure 7:
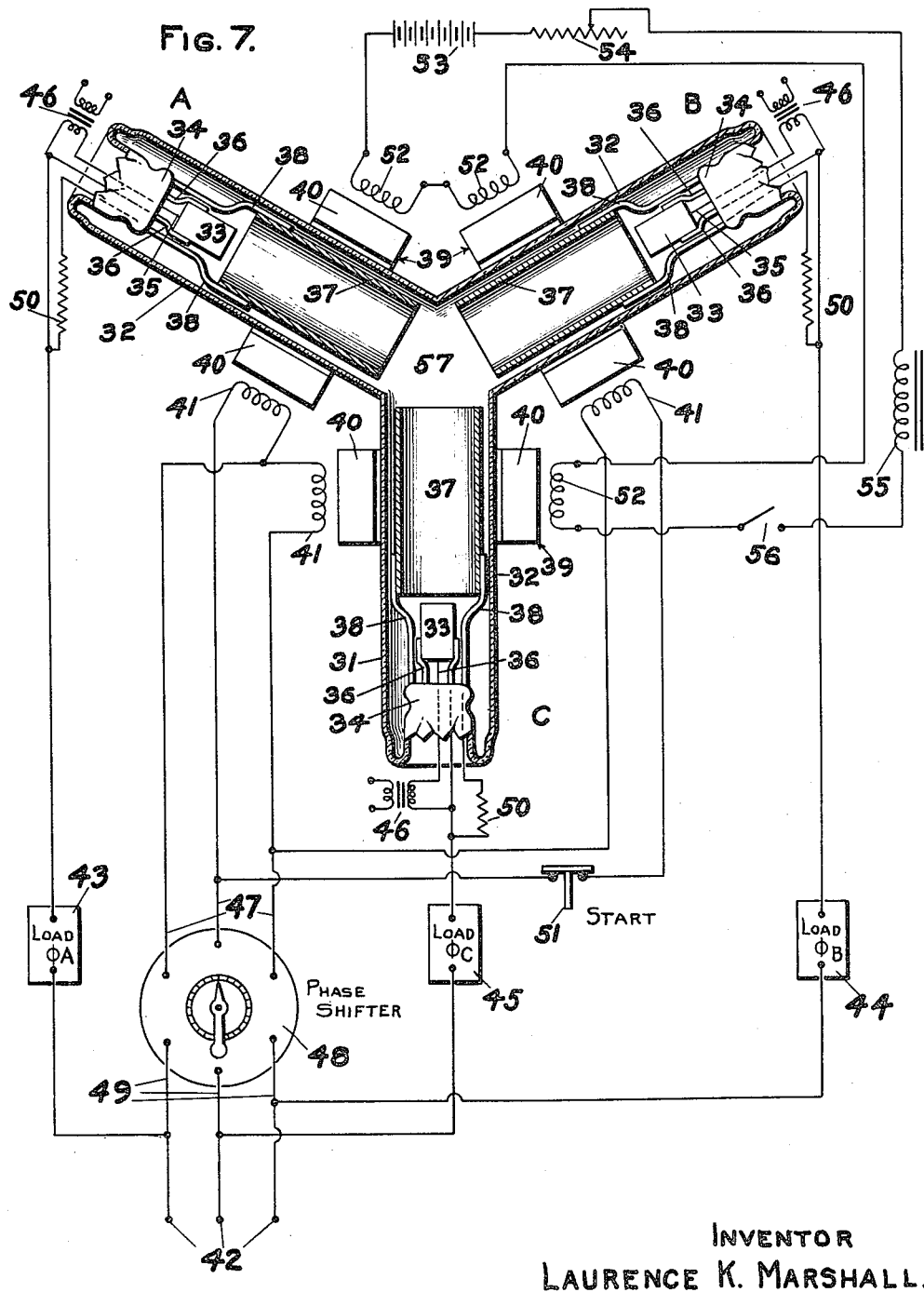
Fig. 7 is a showing similar to Fig. 1 of other embodiments of my novel tube system.

It is possible to utilize other tube structures and control systems incorporating my invention. Fig. 7, for example, represents another modification both of my tube and control system. In this modification the tube illustrated consists of an envelope 31 having three tubular arms 32 connected together at their inner ends. In each arm 32 is mounted a cathode 33 which may be similar to the cathode 4 described more fully in Fig. 1. Each cathode 33 is supported upon a reentrant stem 34 formed in the outer end of the associated tubular arm 32. An external connection is afforded to the outer end of the heating filament by means of a lead 35 sealed through the stem 34. The cathode is supported on the stem 34 by means of a pair of cathode standards 36, one of which extends through the stem 34 to afford an external electrical connection to the cathode. Since, as in Fig. 1, the other end of the heater is electrically connected to the cathode, the external electrical connection to the cathode likewise forms the other connection to the heater.

The arrangement as described above provides a discharge path adjacent each cathode 33, said discharge paths communicating with each other through a common discharge space 57. Within each tubular arm 32 and surrounding the discharge path adjacent the associated cathode is located an intermediate electrode 37 which is similar to the intermediate electrodes 9, as described in Fig. 1. Each intermediate electrode 37 is supported on the associated stem 34 by means of a pair of electrode standards 38, one of which is sealed through the stem 34 to provide an electrical connection to the intermediate electrode 37. As described in connection with Fig. 1, the envelope 31 may be filled with suitable gaseous filling, such as a metallic vapor or other ionizable gases, in order to provide an ionizable medium through which a discharge may pass between the various electrodes.

In order to control the discharge, a magnetic field is set up tranverse to the discharge path within each intermediate electrode 37. This magnetic field may be created by means of a magnetic core 39, having two pole pieces 40 disposed on opposite sides of the associated tubular arm 32. These magnetic cores are similar to the cores 11 described in Fig. 1, and are each energized by means of a coil 41 similar to coil 12 of Fig. 1.

The control of the discharge in the arrangement shown in Fig. 7 is similar to that described in Fig. 1. When conditions are established so that a discharge would normally start through the space within each intermediate electrode 37, such a discharge is prevented from starting if a substantially transverse magnetic field is imposed upon the space by means of the associated core 39. The starting of such a discharge under these conditions is delayed until the transverse magnetic field falls to a predetermined value which for purposes of analysis may be considered as being substantially zero.

The discharge, in passing between two electrodes 33, must pass through two controlled discharge paths. In order that a discharge shall start as desired, the magnetic fields on the two discharge paths in question should both be zero at the same time, or one of the discharge paths should be already conducting in the same direction, whereupon the magnetic field on the other discharge path, upon reaching zero, will permit the discharge to start. Means for accomplishing both of these effects are illustrated in the circuit represented in Fig. 7.

In Fig. 7 a source of three-phase current is connected to three input terminals 42. These three terminals are connected respectively through three phases 43, 44 and 45 of a three-phase load to the three electrodes 33. The three phases 43, 44 and 45 may represent the same type type of load as described in connection with Fig. 1. In order to heat the cathodes 33 to temperature of thermionic emission, a heating transformer 46 is connected to each of the two leads 35 and 36 extending from each cathode 33. Each intermediate electrode 37 may be connected to its associated cathode 33 through a high resistance 50 in order to limit the current which may flow to said intermediate electrode. In absence of the magnetic fields due to the cores 39, when the transformers 46 and the terminals 42 are energized, a discharge will pass between each pair of electrodes 33 whenever an appreciable voltage exists between them, and thus in effect these three electrodes under these conditions might be considered as being directly electrically connected to each other. The effect of such a connection therefor is to permit substantially unimpeded three-phase current to flow through the three phases 43, 44 and 45 of the load.

In order to control the current through the three-phase load, the coils 41 are supplied with current of suitable magnitude and of controllable phase with respect to the voltages impressed upon the electrodes 33 by means of a phase-shifting device 48, which may be similar in form to the phase-shifting device 21 described in connection with Fig. 1. Of course any other type of phase-shifting device may be used to energize the coils 41. The phase-shifting device 48 may be energized from the terminals 42 by means of three conductors 49 connected from said terminals to the input of the phase shifter. The coils 41 may be connected in a delta arrangement, the corners of which are connected by means of conductors 47 to the output of the phase-shifting device 48.

When the coils 41 are energized from the phase-shifting device 48, it will be seen that each field passes through zero at a different time. Since this would ordinarily prevent a discharge from starting, means should be provided for causing two of said fields to be zero at the same time in order to permit the tube to be started. In order to accomplish this, the connection to one of the coils 41 may be broken by means of a starting pushbutton 51. Upon actuating the pushbutton 51, the circuit to the coil 41 is deenergized so that the field produced thereby is reduced to zero. This condition is permitted to persist until one or more of the other fields has passed through zero, and therefore a discharge between at least two of the electrodes 33 is permitted to start. Thereupon the pushbutton 51 may be released to reenergize the associated coil 41.

Figure 8:
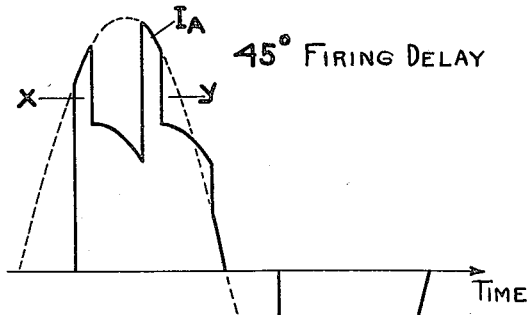
Figs. 8 and 9 are curves representing the current flowing through one electrical phase of the embodiment shown in Fig. 7 under one condition of operation thereof for two values of firing delay.
Figure 9:
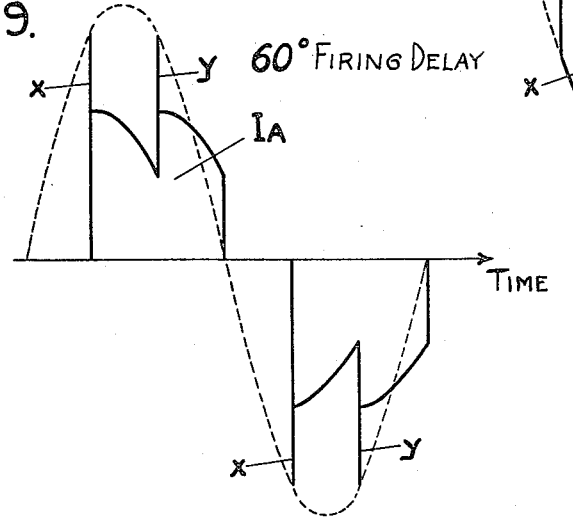

In analyzing the operation of the above system, the three corners of the control tube may be represented by A, B and C. Since the electrode 33 at each of said corners is connected directly in series with the respective load phases 43, 44 and 45, the current flowing to each electrode is likewise the current flowing through its associated phase. Thus the phases 43, 44 and 45 are likewise termed respectively phases A, B and C. If the control fields associated with A, B and C pass through zero at the time that the current to the associated electrode 33 tends to reverse, the discharge which therefore is momentarily extinguished can immediately re-start, and such reversal is permitted to take place without opposition. Under these conditions, uninterrupted alternating current flows to each electrode 33 substantially in the same way as in connection with Fig. 1. Under these conditions the current through each phase may be represented by Fig. 3. If, however, the control fields are delayed in phase so that they pass through zero after the current tends to reverse, such reversal cannot take place. This is due to the fact that the discharge being momentarily extinguished cannot re-start in the opposite direction until the associated magnetic field passes through zero. However, when the discharge to one electrode 33 is extinguished, the discharge passing between the other two electrodes 33 persists for a period of 60 degrees beyond that time. Thus if the control field associated with the extinguished discharge path passes through zero within that 60-degree period, the discharge is permitted to start, inasmuch as at least one of the other discharge paths is conducting in the requisite direction. It will be seen, therefore, that control will be effected by the control coils 41 for all conditions of phase delay between zero and 60 degrees. In Fig. 8, for example, the current to phase A is represented by the solid line for a firing delay of 45 degrees. The dotted line here also represents the current which would flow through the associated phase if no firing delay were present. The two peaked portions $x$ and $y$ represent the periods during which all three phases are conducting so that upon the extinguishment of one of the phases, two of them will persist in the conducting condition. The solid line in Fig. 9 represents the current which would flow in phase A as the firing delay approaches 60 degrees. In Fig. 9 the peaked portions $x$ and $y$ have become much narrower and approach a zero width at 60 degrees firing delay. When the width of $x$ and $y$ becomes zero, the tube no longer conducts because at that point the two conducting phases cease to conduct just at the instant when the magnetic field on the extinguished phase passes through zero, and therefore the conditions for firing the extinguished phase are not satisfied. However, the arrangement of Fig. 7 provides means whereby the control may be effective beyond the condition represented by Fig. 9, as will be described below.

Figure 10:
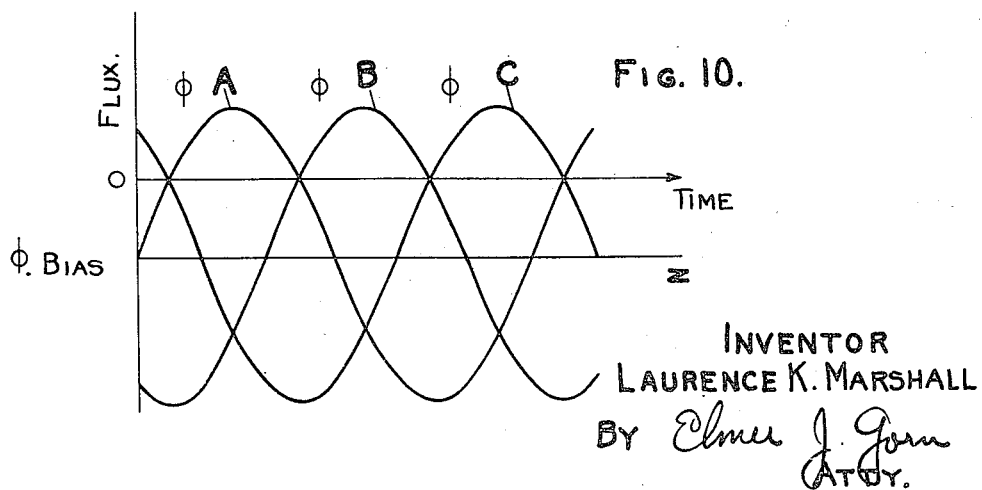
Fig. 10 represents the flux relationships in the control coils for another condition of operation of Fig. 7.

As previously indicated, another way of causing the two discharge paths associated with each pair of electrodes 33 to become conducting is to have the control fields associated with both of said paths pass through zero at the same time. Although this may be accomplished in various ways, one arrangement for producing this result is to bias each magnetic field to a predetermined value. As illustrated in Fig. 10, the fluxes associated with the phases A, B and C may be represented by the three sine waves $\phi A$, $\phi B$ and $\phi C$. If each field is provided with a constant bias of a value represented by the horizontal line Z, the zero axis of the three fluxes $\phi A$, $\phi B$, and $\phi C$ can be made to pass through the point at which said flux curves intersect each other. Therefore it will be seen that under the conditions of Fig. 10, $\phi A$ and $\phi B$ reach zero at one point, 60 degrees later $\phi B$ and $\phi C$ reach zero at the same time, and 60 degrees later $\phi C$ and $\phi A$ reach zero at the same time. Such a relationship of flux when applied to Fig. 7 results in successive firing of the associated pairs of discharge paths.

In order to provide the flux bias described above, each core 39 may be provided with an additional energizing coil 52. The coils 52 may be connected in series with a source of direct current 53 through some suitable current-adjusting rheostat 54. Also included in this circuit might be a choke 55 to limit the value of any alternating current induced in the coils 52 by means of the coils 41. The switch 56 likewise may be included in this circuit to energize or deenergize the coils 52. If, as described above in connection with Fig. 9, the flux-producing current supplied to the coils 41 is shifted to a position of 60 degrees delay, and the coils 52 are energized to the conditions represented in Fig. 10, the resulting operation is that represented in Fig. 11, wherein the solid curve $I_A$ represents the current which would flow in phase A under these conditions. As the phase or the current to the coils 41 is delayed still further, the conditions represented in Fig. 12 are produced. Fig. 12 represents a phase shift of 15 degrees more than that of Fig. 11. As the phase shift delay of the current supplied to the coils 14 is increased, the vertical lines $r$ and $s$ of Fig. 11 shift continuously to the right, thus decreasing the effective value of the current flowing in phase A. Although the control exerted upon the respective discharge paths is effective for phase shifts of less than the 60 degrees represented in Fig. 11, operation under these conditions is undesirable in some instances because the resulting wave form flowing in the associated phase is somewhat unsymmetrical and might under some conditions produce undesirable operating conditions.

It will be noted that for the successive phase delays represented by Figs. 8, 9, 11 and 12, the effective alternating current flowing through the associated phase becomes successively less. Therefore, when it is desired to control the current through the three-phase load, it is merely necessary to adjust the phase-shifting device 48 to secure a greater or lesser degree of phase shift in accordance with whether a smaller or larger value of effective current is desired in each phase of the load. A complete phase delay range of zero degrees to 180 degrees would under these conditions involve merely the closing of switch 56 when a phase delay of substantially 60 degrees was reached.

Instead of energizing the coils 52 to give a field bias of the value indicated by Fig. 10, lesser values of bias could be used. As the flux bias decreased, the operation of the tube would gradually shift from the type of operation represented by Figs. 11 and 12 to the operation represented by Figs. 8 and 9. This fact gives rise to a large number of different possible modes and sequence of operations of the system shown in Fig. 7, as will be apparent to those skilled in the art.

In the arrangement shown in Fig. 7, instead of connecting the intermediate electrodes 37 through high resistances 50 to their associated electrodes 33, the resistance 50 could be omitted. Under these conditions, each intermediate electrode could then act as an anode when the voltage upon it and its associated electrode 33 becomes positive with respect to any other pair of electrodes so that the electron current would tend to flow thereto. In this case it would only be necessary to have the magnetic field associated with the discharge path through said intermediate electrode pass through zero to permit firing of the discharge in but one direction, namely that in which the associated electrode 33 tends to become a cathode. Operation under this set of conditions can be carried out by means of the coils 41 alone, and the resultant current flow in the associated phases is substantially the same as that described in connection with Fig. 1.

Figure 13:
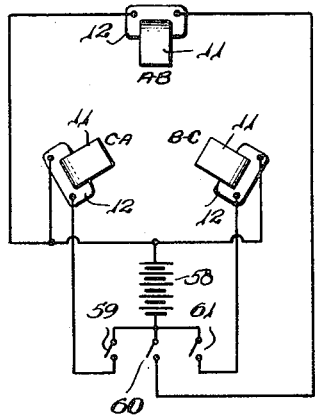
Fig. 13 is a diagrammatic representation of another arrangement for energizing control coils of either Fig. 1 or Fig. 7.

My novel tube arrangement lends itself to a wide variety of control arrangements. For example, the tubes illustrated may be used to determine which phases of a plural-phase arrangement may conduct current. Thus in Fig. 13 the coils 12 of the currents 11 may each be supplied independently with direct current from a source of direct current 58 through individual switches 59, 60 and 61, respectively. Thus if switches 59 and 61 are closed, the core associated with the discharge path between A and B of Fig. 1 is deenergized, and permits single-phase current only to flow in phases A and B. By proper manipulation of the switches in Fig. 13, single-phase current may be permitted to flow only through phases C and B or through phases C and A, respectively. When the arrangement illustrated in Fig. 13 is applied to Fig. 7, manipulation of the switches 59, 60 and 61 will produce a similar result.

Of course it is to be understood that this invention is not limited to the particular details of construction or arrangement as defined above as many equivalents will suggest themselves to those skilled in the art. For example, any number of main electrodes, greater than three, could be used and disposed with respect to each other so as to provide a plurality of discharge paths between them. Such larger numbers of electrodes could be utilized in connection with a larger number of alternating current phases. Also other means than the particular magnetic means shown might be devised for delaying the initiation of the discharge in each of the controlled discharge paths. It is accordingly desired that the appended claims be given a broad interpretation commensurate with the scope of this invention.

What is claimed is:

1. An electrical discharge device comprising an envelope containing three or more electrodes each adapted to operate both as a cathode and as an anode, and an ionizable atmosphere at a pressure sufficient to produce copious ionization upon the passage of a discharge therein, said electrodes disposed with respect to each other to provide three or more discharge paths between them, and means for delaying the initiation of discharges in said paths after the application of voltages sufficient to initiate such discharges between the electrodes associated with said paths.

2. An electrical discharge device comprising an envelope containing three or more electrodes each adapted to operate both as a cathode and as an anode, and an ionizable atmosphere at a pressure sufficient to produce copious ionization upon the passage of a discharge therein, said electrodes disposed with respect to each other to provide three or more discharge paths between them, and means for impressing magnetic fields on said discharge paths for delaying the initiation of discharges in said paths after the application of voltages sufficient to initiate such discharges between the electrodes associated with said paths.

3. An electrical discharge device comprising an envelope containing three or more electrodes each adapted to operate both as a cathode and as an anode, and an ionizable atmosphere at a pressure sufficient to produce copious ionization upon the passage of a discharge therein, said electrodes disposed with respect to each other to provide three or more discharge paths between them, and means for impressing magnetic fields transversely to said discharge paths for delaying the initiation of discharges in said paths after the application of voltages sufficient to initiate such discharges between the electrodes associated with said path.

4. An electrical discharge device comprising an envelope containing three or more electrodes each adapted to operate both as a cathode and as an anode, an ionizable atmosphere at a pressure sufficient to produce copious ionization upon the passage of a discharge therein, said electrodes disposed with respect to each other to provide three or more discharge paths between them, and auxiliary electrodes disposed adjacent said discharge paths, and means for impressing magnetic fields transversely to said discharge paths adjacent said auxiliary electrodes for delaying the initiation of discharges in said paths after the application of voltages sufficient to initiate such discharges between the electrodes associated with said paths.

5. An electrical discharge device comprising an envelope containing three electrodes each adapted to operate both as a cathode and as an anode, and an ionizable atmosphere at a pressure sufficient to produce copious ionization upon the passage of a discharge therein, said electrodes being disposed within said envelope to form the corners of a triangle to provide three separate discharge paths between them, and means for delaying the initiation of discharges in said paths after the application of voltages sufficient to initiate such discharges between the electrodes associated with said paths.

6. An electrical discharge device comprising an envelope containing three electrodes each adapted to operate both as a cathode and as an anode, and an ionizable atmosphere at a pressure sufficient to produce copious ionization upon the passage of a discharge therein, said electrodes being disposed within said envelope to form the corners of a triangle to provide three separate discharge paths between them, and means for impressing magnetic fields on said discharge paths for delaying the initiation of discharges in said paths after the application of voltages sufficient to initiate such discharges between the electrodes associated with said paths.

7. An electrical discharge device comprising an envelope containing three electrodes each adapted to operate both as a cathode and as an anode, an ionizable atmosphere at a pressure sufficient to produce copious ionization upon the passage of a discharge therein, said electrodes being disposed within said envelope to form the corners of a triangle to provide three separate discharge paths between them, and auxiliary electrodes disposed adjacent said discharge paths, and means for impressing magnetic fields transversely to said discharge paths adjacent said auxiliary electrodes for delaying the initiation of discharges in said paths after the application of voltages sufficient to initiate such discharges between the electrodes associated with said paths.

8. An electrical discharge system comprising a tube containing three or more electrodes each adapted to operate both as a cathode and as an anode, and an ionizable atmosphere at a pressure sufficient to produce copious ionization upon the passage of a discharge therein, said electrodes disposed with respect to each other to provide three or more discharge paths between them, a source of multiple-phase alternating current, means for connecting said electrodes to different phases of said source, and means for delaying the initiation of discharges in said paths after the application of voltage sufficient to initiate such discharges between the electrodes associated with said paths.

9. An electrical discharge system comprising a tube containing three or more electrodes each adapted to operate both as a cathode and as an anode, and an ionizable atmosphere at a pressure sufficient to produce copious ionization upon the passage of a discharge therein, said electrodes disposed with respect to each other to provide three or more discharge paths between them, a source of multiple-phase alternating current, means for connecting said electrodes to different phases of said source, a multiple-phase load, the phases of said load being connected in series with said electrodes, and means for delaying the initiation of discharges in said paths after the application of a voltage sufficient to initiate such discharges between the electrodes associated with said paths.

10. An electrical discharge system comprising a tube containing three or more electrodes each adapted to operate both as a cathode and as an anode, and an ionizable atmosphere at a pressure sufficient to produce copious ionization upon the passage of a discharge therein, a source of multiple-phase alternating current, means for connecting said electrodes to different phases of said source, control means for delaying the initiation of discharges in said discharge paths, and means for energizing said control means with alternating currents bearing definite phase relations to the voltages impressed upon the associated pairs of electrodes.

11. An electrical discharge system comprising a tube containing three or more electrodes each adapted to operate both as a cathode and as an anode, and an ionizable atmosphere at a pressure sufficient to produce copious ionization upon the passage of a discharge therein, a source of multiple-phase alternating current, means for connecting said electrodes to different phases of said source, control means for delaying the initiation of discharges in said discharge paths, means for energizing said control means with alternating currents bearing definite phase relations to the voltages impressed upon the associated pairs of electrodes, and means for shifting said phase relations.

12. An electrical discharge system comprising a tube containing three or more electrodes each adapted to operate both as a cathode and as an anode, and an ionizable atmosphere at a pressure sufficient to produce copious ionization upon the passage of a discharge therein, a source of multiple-phase alternating current, means for connecting said electrodes to different phases of said source, control means for impressing magnetic fields transversely to said discharge paths to delay the initiation of discharges therein, and means for energizing said control means with alternating currents bearing definite phase relations to the voltages impressed upon the associated pairs of electrodes.

13. An electrical discharge system comprising a tube containing three or more electrodes each adapted to operate both as a cathode and as an anode, and an ionizable atmosphere at a pressure sufficient to produce copious ionization upon the passage of a discharge therein, a source of multiple-phase alternating current, means for connecting said electrodes to different phases of said source, control means for impressing magnetic fields transversely to said discharge paths to delay the initiation of discharges therein, means for energizing said control means with alternating currents bearing definite phase relations to the voltages impressed upon the associated pairs of electrodes, and means for shifting said phase relations.

14. An electrical discharge system comprising a tube containing three or more electrodes each adapted to operate both as a cathode and as an anode, and an ionizable atmosphere at a pressure sufficient to produce copious ionization upon the passage of a discharge therein, a source of multiple-phase alternating currrent, means for connecting said electrodes to different phases of said source, control means for impressing magnetic fields on said discharge paths to delay the initiation of discharges therein, and means for energizing said control means with alternating currents bearing definite phase relations to the voltages impressed upon the associated pairs of electrodes.

15. An electrical discharge device comprising an envelope containing three or more electrodes adapted to operate as cathodes, and an ionizable atmosphere at a pressure sufficient to produce copious ionization upon the passage of a discharge therein, said electrodes disposed with respect to each other to provide three or more discharge paths between them, and means for delaying the initiation of discharges in said paths after the application of voltages sufficient to initiate such discharges between the electrodes associated with said paths.

16. An electrical discharge device comprising an envelope containing three or more electrodes adapted to operate as cathodes, an ionizable atmosphere at a pressure sufficient to produce copious ionization upon the passage of a discharge therein, said electrodes disposed with respect to each other to provide three or more discharge paths between them, and auxiliary electrodes disposed adjacent said discharge paths, and means for impressing magnetic fields transversely to said discharge paths adjacent said auxiliary electrodes for delaying the initiation of discharges in said paths after the application of voltages sufficient to initiate such discharges between the electrodes associated with said paths.

17. An electrical discharge device comprising an envelope containing three or more electrodes adapted to operate as cathodes, an ionizable atmosphere at a pressure sufficient to produce copious ionization upon the passage of a discharge therein, said electrodes disposed with respect to each other to provide discharge paths adjacent said electrodes with said discharge paths communicating with each other through a common discharge space, and auxiliary electrodes disposed adjacent said discharge paths, and means for impressing magnetic fields transversely to said discharge paths adjacent said auxiliary electrodes for delaying the initiation of discharges in said paths after the application of voltage sufficient to initiate such discharges between the electrodes associated with said paths.

18. An electrical discharge device comprising an envelope containing three or more electrodes adapted to operate as cathodes, an ionizable atmosphere at a pressure sufficient to produce copious ionization upon the passage of a discharge therein, said electrodes disposed with respect to each other to provide discharge paths adjacent said electrodes with said discharge paths communicating with each other through a common discharge space, auxiliary electrodes disposed adjacent said discharge paths, said auxiliary electrodes being directly electrically connected to their associated electrodes, and means for impressing magnetic fields transversely to said discharge paths adjacent said auxiliary electrodes for delaying the initiation of discharges in said paths after the application of voltages sufficient to initiate such discharges between the electrodes associated with said paths.

19. An electrical discharge system comprising a tube containing three or more electrodes adapted to operate as cathodes, an ionizable atmosphere at a pressure sufficient to produce copious ionization upon the passage of a discharge therein, said electrodes disposed with respect to each other to provide discharge paths adjacent said electrodes with said discharge paths communicating with each other through a common discharge space, and a source of multiple-phase alternating current, means for connecting said electrodes to different phases of said source, control means for impressing magnetic fields on said discharge paths to delay the initiation of discharges therein until said fields fall to predetermined values, and means for causing said magnetic field of said control means to drop to said predetermined values during the times when at least two of said discharge paths are conducting current in series with each other.

20. An electrical discharge system comprising a tube containing three or more electrodes adapted to operate as cathodes, an ionizable atmosphere at a pressure sufficient to produce copious ionization upon the passage of a discharge therein, said electrodes disposed with respect to each other to provide discharge paths adjacent said electrodes with said discharge paths communicating with each other through a common discharge space, and a source of multiple-phase alternating current, means for connecting said electrodes to different phases of said source, control means for impressing magnetic fields on said discharge paths to delay the initiation of discharges therein until said fields fall to predetermined values, and means for causing the magnetic fields of successive pairs of said control means to drop to said predetermined values during substantially the same period so that a discharge shall start between successive pairs of said discharge paths in series.

21. An electrical discharge system comprising a tube containing three or more electrodes adapted to operate as cathodes, an ionizable atmosphere at a pressure sufficient to produce copious ionization upon the passage of a discharge therein, said electrodes disposed with respect to each other to provide discharge paths adjacent said electrodes with said discharge paths communicating with each other through a common discharge space, and a source of multiple-phase alternating current, means for connecting said electrodes to different phases of said source, control means for impressing magnetic fields on said discharge paths to delay the initiation of discharges therein until said fields fall to predetermined values, and means for energizing said control means with alternating currents bearing definite phase relations to the voltages impressed upon their associated electrodes.

22. An electrical discharge system comprising a tube containing three or more electrodes adapted to operate as cathodes, an ionizable atmosphere at a pressure sufficient to produce copious ionization upon the passage of a discharge therein, said electrodes disposed with respect to each other to provide discharge paths adjacent said electrodes with said discharge paths communicating with each other through a common discharge space, and a source of multiple-phase alternating current, means for connecting said electrodes to different phases of said source, control means for impressing magnetic fields on said discharge paths to delay the initiation of discharges therein until said fields fall to predetermined values, means for energizing said control means with alternating currents bearing definite phase relations to the voltages impressed upon their associated electrodes, and means for shifting said phase relations.

23. An electrical discharge system comprising a tube containing three or more electrodes adapted to operate as cathodes, an ionizable atmosphere at a pressure sufficient to produce copious ionization upon the passage of a discharge therein, said electrodes disposed with respect to each other to provide discharge paths adjacent said electrodes with said discharge paths communicating with each other through a common discharge space, and a source of multiple-phase alternating current, means for connecting said electrodes to different phases of said source, control means for impressing magnetic fields on said discharge paths to delay the initiation of discharges therein until said fields fall to predetermined values, means for energizing said control means with alternating currents bearing definite phase relations to the voltages impressed upon their associated electrodes, means for shifting said phase relations, and means for impressing on said first-named fields predetermined values of substantially constant flux.

24. An electrical discharge system comprising a tube containing three or more electrodes adapted to operate as cathodes, an ionizable atmosphere at a pressure sufficient to produce copious ionization upon the passage of a discharge therein, said electrodes disposed with respect to each other to provide three or more discharge paths between them, auxiliary electrodes disposed adjacent said discharge paths, a source of multiple-phase alternating current, means for connecting said electrodes to different phases of said source, and a multiple-phase load, the phases of said load being connected in series with said electrodes, control means for preventing the initiation of discharges in said discharge paths, and means for selectively deenergizing said control means to permit single-phase current to flow through selected phases of said load.

25. An electrical discharge system comprising a tube containing three or more electrodes adapted to operate as cathodes, and an ionizable atmosphere at a pressure sufficient to produce copious ionization upon the passage of a discharge therein, said electrodes disposed with respect to each other to provide three or more discharge paths between them, a source of multiphase alternating current, means for connecting said electrodes to different phases of said source, and means for delaying the initiation of discharges in said paths under the application of voltages sufficient to initiate such discharges between the electrodes associated with said paths.

LAURENCE K. MARSHALL.